(12) United States Patent
Chen et al.

(10) Patent No.: US 9,629,201 B2
(45) Date of Patent: Apr. 18, 2017

(54) USING WI-FI AS HUMAN CONTROL INTERFACE

(71) Applicant: QUALCOMM Incorporated, San Diego, CA (US)

(72) Inventors: Xuetao Chen, Fremont, CA (US); Eyal Hochdorf, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 71 days.

(21) Appl. No.: 14/860,220

(22) Filed: Sep. 21, 2015

(65) Prior Publication Data

US 2017/0086256 A1 Mar. 23, 2017

(51) Int. Cl.
*H04W 84/14* (2009.01)
*H04L 12/26* (2006.01)

(52) U.S. Cl.
CPC .............. *H04W 84/14* (2013.01); *H04L 43/08* (2013.01); *H04L 43/16* (2013.01)

(58) Field of Classification Search
CPC ......... H04W 84/18; H04L 43/08; H04L 43/16
See application file for complete search history.

(56) References Cited

U.S. PATENT DOCUMENTS

| | | | |
|---|---|---|---|
| 8,421,752 B2 | 4/2013 | Deluca | |
| 2008/0228496 A1* | 9/2008 | Yu | G06F 3/038 704/275 |
| 2011/0181509 A1 | 7/2011 | Rautiainen et al. | |
| 2011/0181510 A1 | 7/2011 | Hakala et al. | |
| 2013/0113647 A1* | 5/2013 | Sentelle | G01S 13/32 342/22 |
| 2013/0154919 A1* | 6/2013 | Tan | G01S 15/50 345/156 |

FOREIGN PATENT DOCUMENTS

WO  WO-2014165476 A1  10/2014

OTHER PUBLICATIONS

Abdelnasser H., et al.,"Wiliest: A Ubiquitous WiFi-based Gesture Recognition System," 2015 IEEE Conference on Computer Communications (INFOCOM), Apr. 1, 2015 (Apr. 1, 2015), pp. 1472-1480, XP055314704, DOI: 10.1109/INFOCOM.2015.7218525 ISBN: 978-1-4799-8381-0.

(Continued)

*Primary Examiner* — Duc C Ho
(74) *Attorney, Agent, or Firm* — Paradice and Li LLP

(57) ABSTRACT

A system and method for operating a human control interface (HCI) for one or more devices in a wireless network. A first device in the wireless network determines an amount of noise in the wireless network, and selects one of a plurality of sounding techniques based at least in part on the determined amount of noise. The wireless communications device further detects a pattern of Doppler shifts in a received set of wireless signals using the selected sounding technique, and identifies a Doppler signature based at least in part on the pattern of Doppler shifts. The wireless communications device then associates the Doppler signature with a user input for controlling a second device in the wireless network.

30 Claims, 9 Drawing Sheets

(56) References Cited

OTHER PUBLICATIONS

Bo T., et al.,"A Real-time High Resolution Passive WiFi Doppler-radar and its Applications," 2014 International Radar Conference, IEEE, Oct. 13, 2014 (Oct. 13, 2014), pp. 1-6, XP032746268, DOI: 10.1109/RADAR.2014.7060359 [retrieved on Mar. 12, 2015].
International Search Report and Written Opinion—PCT/US2016/047908—ISA/EPO—Nov. 7, 2016.
Stephan S., et al., "The Telepathic Phone: Frictionless Activity Recognition from WiFi-RSSI," 2014 IEEE International Conference on Pervasive Computing and Communications (PERCOM), IEEE, Mar. 24, 2014 (Mar. 24, 2014), pp. 148-155, XP032594219, DOI 10.1109/PERCOM.2014.6813955 [retrieved on May 9, 2014].
Abdelnasser H., et al., "WiGest: A Ubiquitous WiFi-based Gesture Recognition System," May 18, 2015, 10 pages.
Gupta S., et al., "SoundWave: using the Doppler Effect to Sense Gestures," Proceedings of the SIGCHI Conference on Human Factors in Computing Systems, 2012, pp. 1911-1914.

\* cited by examiner

USING WI-FI AS HUMAN CONTROL INTERFACE

TECHNICAL FIELD

The example embodiments relate generally to wireless networks, and specifically to operating one or more devices in a wireless network using a human control interface.

BACKGROUND OF RELATED ART

A human control interface (HCI) may interpret body movements and/or gestures as communication inputs for electronic devices (e.g., televisions, phones, computers, etc.). Modern HCI systems rely on sophisticated sensor technology (e.g., cameras, infrared, and/or touch-based sensors) to detect human activity. However, such sensors are typically limited in range (e.g., touch sensors) and/or require a direct line-of-sight with the human operator (e.g., camera and/or infrared sensors). Moreover, the sensors are expensive and may require additional hardware and/or software support to be integrated with existing Internet of Everything (IoE) infrastructure.

IoE devices often communicate wirelessly with one another based on the IEEE 802.11 ("Wi-Fi") standards. For example, IoE systems typically operate in an "infrastructure mode" for which a wireless local area network (WLAN) is formed by one or more access points (APs) that provide a shared wireless communication medium for use by a number of client devices or stations (STAs). In infrastructure mode, most (if not all) communications in the WLAN are routed through the APs. Each AP, which may correspond to a Basic Service Set (BSS) or an extended BSS, periodically broadcasts beacon frames to enable any STAs within wireless range of the AP to establish and/or maintain a communication link with the AP.

Accordingly, it may be desirable to deploy HCI systems with existing wireless communication networks, for example, to reduce the cost and/or complexity of the HCI system.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A system and method for operating a human control interface (HCI) for one or more devices in a wireless network is described herein. A first device in the wireless network determines an amount of noise in the wireless network, and selects one of a plurality of sounding techniques based at least in part on the determined amount of noise. The wireless communications device further detects a pattern of Doppler shifts in a received set of wireless signals using the selected sounding technique, and identifies a Doppler signature based at least in part on the pattern of Doppler shifts. The wireless communications device then associates the Doppler signature with a user input for controlling a second device in the wireless network.

In example embodiments, the first device may select a data-compliant sounding technique based on the amount of noise being less than a threshold level. For example, the received set of wireless signals may include data packets transmitted by the second device. Thus, the first device may process payload information from the data packets while concurrently detecting the pattern of Doppler shifts. In other embodiments, the first device may select a radar sounding technique based on the amount of noise being greater than the threshold level. For example, the received set of wireless signals may include radar signals transmitted by the first device.

The first device may detect multiple patterns of Doppler shifts in wireless signals received from a plurality of devices in the wireless network. In example embodiments, the first device may select one of the multiple patterns to be a representative Doppler pattern, and may identify the Doppler signature based on the selected pattern of Doppler shifts. For example, the first device may select one of the multiple patterns based at least in part on a vote among the plurality of devices. In particular, the first device may select a most commonly-detected pattern by the plurality of devices to be the representative Doppler pattern. Still further, the first device may apply a weighting metric to the vote associated with each of the plurality of devices, the weighting metric based at least in part on a signal quality of the wireless signals received from the corresponding device.

BRIEF DESCRIPTION OF THE DRAWINGS

The example embodiments are illustrated by way of example and are not intended to be limited by the figures of the accompanying drawings, where.

DETAILED DESCRIPTION

Figure 1A:
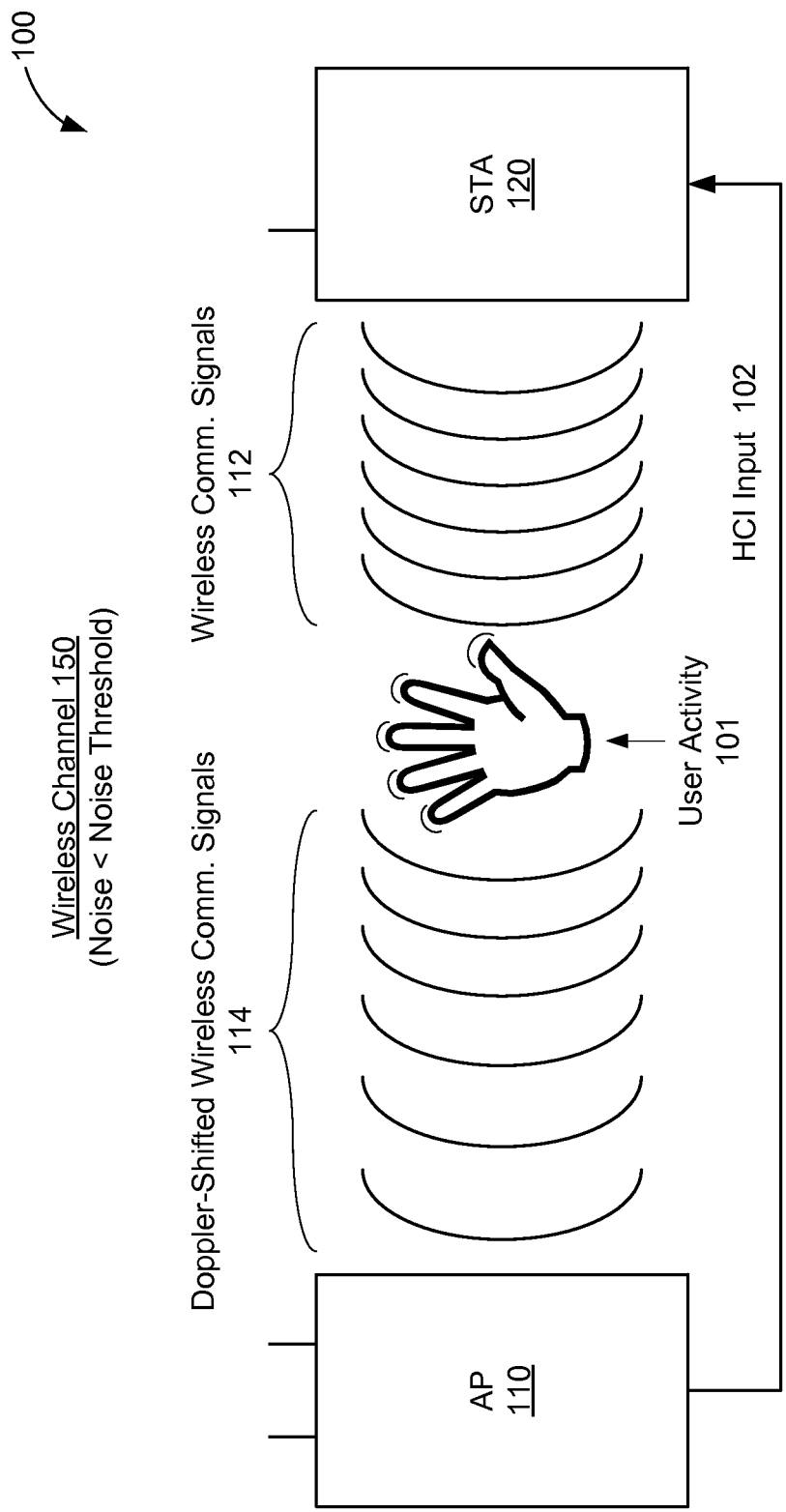
FIGS. 1A and 1B show block diagrams of a wireless human control interface (HCI) system 100, in accordance with example embodiments.

The example embodiments are described below in the context of WLAN systems for simplicity only. It is to be understood that the example embodiments are equally applicable to other wireless networks (e.g., cellular networks, pico networks, femto networks, satellite networks), as well as for systems using signals of one or more wired standards or protocols (e.g., Ethernet and/or HomePlug/PLC standards). As used herein, the terms "WLAN" and "Wi-Fi®" may include communications governed by the IEEE 802.11 family of standards, BLUETOOTH® (Bluetooth), HiperLAN (a set of wireless standards, comparable to the IEEE 802.11 standards, used primarily in Europe), and other technologies used in wireless communications. Thus, the terms "WLAN" and "Wi-Fi" may be used interchangeably herein. In addition, although described below in terms of an infrastructure WLAN system including one or more APs and a number of STAs, the example embodiments are equally applicable to other WLAN systems including, for example, multiple WLANs, peer-to-peer (or Independent Basic Service Set) systems, Wi-Fi Direct systems, and/or Hotspots. In addition, although described herein in terms of exchanging data packets between wireless devices, the example embodiments may be applied to the exchange of any data unit, packet, and/or frame between wireless devices.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present embodiments. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processes and other symbolic representations of operations on data bits within a computer memory. These descriptions and representations are the means used by those skilled in the data processing arts to most effectively convey the substance of their work to other skilled in the art.

The interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scopes all embodiments defined by the appended claims. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "calculating," "monitoring," "comparing," "applying," "updating," "measuring," "deriving," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Figure 1B:
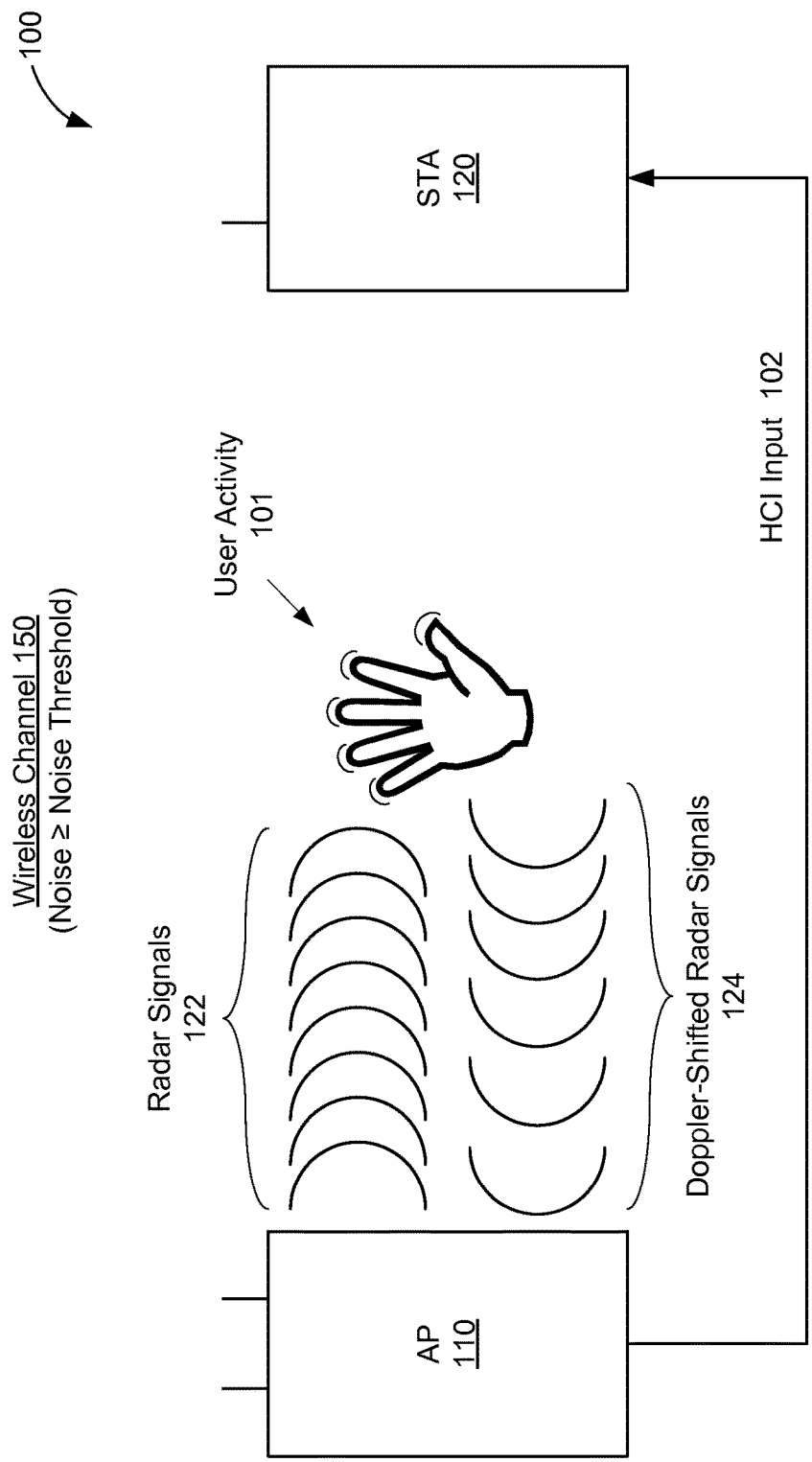

FIGS. 1A and 1B show block diagrams of a wireless HCI system 100 implementing a human control interface (HCI), in accordance with example embodiments. The wireless HCI system 100 is shown to include a wireless access point (AP) 110 and a wireless station (STA) 120. The AP 110 may form a wireless local area network (WLAN) that may operate according to the IEEE 802.11 family of standards (or according to other suitable wireless protocols). Accordingly, the AP 110 may communicate with the STA 120 via a wireless channel 150. The AP 110 is assigned a unique MAC address that is programmed therein by, for example, the manufacturer of the access point. Similarly, the STA 120 is also assigned a unique MAC address.

The AP 110 may be any suitable device that allows one or more wireless devices to connect to a network (e.g., a local area network (LAN), wide area network (WAN), metropolitan area network (MAN), and/or the Internet) via AP 110 using Wi-Fi, Bluetooth, or any other suitable wireless communication standards. In some embodiments, the AP 110 may be a wireless station configured as a software-enabled access point ("SoftAP"). For at least one embodiment, AP 110 may include one or more transceivers, one or more processing resources (e.g., processors and/or ASICs), one or more memory resources, and a power source. The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 5-8.

The STA 120 may be any suitable Wi-Fi enabled wireless device including, for example, a cell phone, personal digital assistant (PDA), tablet device, laptop computer, or the like. Each station STA may also be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. For at least some embodiments, each station STA may include one or more transceivers, one or more processing resources (e.g., processors and/or ASICs), one or more memory resources, and a power source (e.g., a battery).

For the AP 110 and/or STA 120, the one or more transceivers may include Wi-Fi transceivers, Bluetooth transceivers, cellular transceivers, and/or other suitable radio frequency (RF) transceivers (not shown for simplicity) to transmit and receive wireless communication signals. Each transceiver may communicate with other wireless devices in distinct operating frequency bands and/or using distinct communication protocols. For example, the Wi-Fi transceiver may communicate within a 2.4 GHz frequency band, a 5 GHz frequency band, and/or a 60 GHz frequency band in accordance with the IEEE 802.11 specification. The cellular transceiver may communicate within various RF frequency bands in accordance with a 4G Long Term Evolution (LTE) protocol described by the 3rd Generation Partnership Project (3GPP) (e.g., between approximately 700 MHz and approximately 3.9 GHz) and/or in accordance with other cellular protocols (e.g., a Global System for Mobile (GSM) communications protocol). In other embodiments, the transceivers included within the AP 110 and/or STA 120 may be any technically feasible transceiver such as a ZigBee transceiver described by a specification from the ZigBee specification, a WiGig transceiver, and/or a Home-Plug transceiver described a specification from the Home-Plug Alliance.

The AP 110 may detect user activity 101 in the wireless channel 150 based on Doppler shifts in a set of wireless signals received by the AP 110. The user activity 101 may correspond to any type of gesture (e.g., such as the user waving a hand, raising an arm, etc.) or interaction with the wireless channel 150 that causes a detectable pattern of Doppler shifts in wireless signals propagating through the wireless channel 150. For example, the user's body movements may interfere with wireless signals propagating through the wireless channel 150. Such interference may alter the phase and/or frequency of the wireless signals (e.g., known as "Doppler shifts") during transmission from a transmitting device to a receiving device.

Doppler shifts may be detected and/or characterized in a number of different ways. In one example, Doppler shifts may be detected based on variations in throughput (e.g., packet error rate (PER)) of a received signal. Moreover, different types of movements and/or gestures may produce different patterns of Doppler shifts in the wireless signals. For example, the change in PER caused by a person walking between the AP 110 and the STA 120 may be different than the change in PER caused by a person rotating an arm in the space between the AP 110 and STA 120. The AP 110 may distinguish among known patterns of Doppler shifts ("Doppler signatures"), and associate each Doppler signature with a particular user input (e.g., HCI input 102). The AP 110 may then provide the HCI input 102 to the STA 120 (e.g., as a user input) to operate and/or control one or more functions of the STA 120.

In example embodiments, the AP 110 may select one of a plurality of HCI sounding techniques to be used for detecting the user activity 101, for example, based on an amount of noise in the wireless channel 150. A "sounding technique" may determine how the AP 110 detects user activity 101 in the wireless channel 150. For example, the sounding technique may determine the type of wireless signals (e.g., from data signals or radar signals) to be used to invoke a Doppler response from the wireless channel 150, the process for generating the Doppler response (e.g., forward-scattering or backscattering), and/or the means by which Doppler information is extracted from the wireless signals (e.g., preamble data, payload data, or radar information). Thus, each of the plurality of HCI sounding techniques may define a different set of processes and/or protocols to be used by the AP 110 for detecting user activity 101.

As described in greater detail below, certain sounding techniques may be preferable over others depending on the amount of noise in the wireless channel 150 at any given time. For example, a large amount of noise and/or other interference in the wireless channel 150 may reduce the signal-to-noise ratio (SNR) (e.g., or signal-to-interference-plus-noise ratio (SINR)) of wireless communications between the AP 110 and the STA 120. Thus, data-dependent sounding techniques may be less reliable for purposes of detecting user activity 101 than other (e.g., radar-based) sounding techniques when there is substantial noise (e.g., greater than a threshold level) in the wireless channel 150. On the other hand, while radar-based sounding techniques may be more robust against noise, the transmission of radar signals may interrupt the flow of data traffic between the AP 110 and the STA 120. Thus, in example embodiments, the AP 110 may implement a data-compliant sounding technique when the noise in the wireless channel 150 is less than a threshold noise level, and may implement a radar-based sounding technique when the noise in the wireless channel 150 is greater than or equal to the threshold noise level.

With reference to FIG. 1A, the AP 110 may implement a data-compliant (e.g., forward-scattering) sounding technique if the amount of noise in the wireless channel 150 is less than a threshold noise level. For example, the STA 120 may transmit wireless communication signals 112 to the AP 110 via the wireless channel 150. User activity 101 (e.g., gestures, body movements, etc.) in the wireless channel 150 alters the phase and/or frequency of the wireless communication signals 112. As a result, the AP 110 receives the originally-transmitted wireless communication signals 112 as a set of Doppler-shifted wireless communication signals 114. In example embodiments, the AP 110 may detect the pattern of Doppler shifts, caused by the user activity 101, based on information communicated in the wireless communication signals 114. For example, the wireless communication signals 114 may correspond with a set of data packets defined by the IEEE 802.11 specification. In particular, each data packet includes at least a preamble (e.g., used to delineate the end of the header and start of the data portion of the data packet) and a payload (e.g., the actual data to be communicated between two devices).

For some embodiments, the AP 110 may detect the pattern of Doppler shifts in the received communication signals 114 based on the data in the preambles of received data packets. For example, the IEEE 802.11 standards define a long training field (LTF) to be included in the preamble of every data packet transmitted over a wireless channel. The LTF is typically used for estimating channel state information (CSI) and includes a sequence of training data that is known to the receiver (e.g., AP 110). Thus, the AP 110 may compare the received training data (e.g., from the preamble) with their known values to determine the effects of the wireless channel 150 (e.g., the Doppler shifts caused by the user activity 101) on the transmitted data.

For other embodiments, the AP 110 may detect the pattern of Doppler shifts in the received communication signals 114 based on the data in the payload of the received data packets. For example, the payload data may include a set of "sounding data" (e.g., data transmitted for purposes of detecting user activity 101) and/or any other data intended to be communicated between the STA 120 and the AP 110 (e.g., "communications data"). The AP 110 may decode the transmitted data bits, use the decoded bits to normalize the received data, and then determine a channel response for the wireless channel 150 (e.g., using zero-forcing equalization techniques). The determined channel response may be representative of the pattern of Doppler shifts caused by the user activity 101.

By implementing a data-compliant sounding technique (e.g., as described above with respect to FIG. 1A), the AP 110 may detect the user activity 101 in the wireless channel 150 without interrupting data communications with the STA 120 and/or other STAs in the wireless network. Moreover, in example embodiments, the AP 110 may analyze the Doppler shifts based on the received communication signals 114 while simultaneously or concurrently processing data received from the communication signals 114. For example, the AP 110 may analyze the preamble information of a received data packet to generate the HCI input 102 while concurrently processing payload data from the received data packet.

As described above, the example embodiments recognize that it may not always be practical (or feasible) to implement data-compliant HCI sounding techniques (e.g., depending on the amount of noise in the wireless channel 150). For example, due to the amount of information conveyed by each data packet, the wireless communication signals 112 may be highly susceptible to noise in the wireless channel 150. Thus, significant amounts of noise in the wireless channel 150 may make it difficult, if not impossible, for the AP 110 to properly recover the data transmitted on the wireless communication signals 112 and/or to detect the pattern of Doppler shifts in the received communication signals 114.

With reference to FIG. 1B, the AP 110 may implement a radar-based (e.g., backscattering) sounding technique if the amount of noise in the wireless channel 150 is greater than or equal to a threshold noise level. For example, the AP 110 may transmit or broadcast radar signals 122 in the wireless channel 150 and measure the reflected signals to detect and/or identify objects in the wireless channel 150. User activity 101 (e.g., gestures, body movements, etc.) in the wireless channel 150 may alter the phase and/or frequency of the radar signals 122. As a result, the AP 110 receives the reflected radar signals 122 as a set of Doppler-shifted radar signals 124. In example embodiments, the AP 110 may directly measure the Doppler shifts caused by the user activity 101 in the reflected radar signals 124. For example, the radar signals 122 may be un-modulated continuous-wave (CW) radar signals (e.g., containing a single frequency or signal tone) that are typically used in detecting object velocity. Alternatively, pulse compression techniques may be used in generating the radar signals 122 (e.g., to increase SNR and/or reduce interference and interruptions to data communication systems).

For some embodiments, the AP 110 may broadcast single-tone (e.g., un-modulated) CW radar signals 122 and detect the pattern of Doppler shifts in the reflected (e.g., backscattered) radar signals 124. For example, the AP 110 may detect the Doppler shifts by measuring the phase difference between the transmission of the radar signals 122 and the reception of the reflected radar signals 124. User activity 101 in the wireless channel 150 may introduce a low frequency sinusoidal modulation on the amplitudes of real and/or imaginary parts of successive radar signals 122. The amplitude variations may thus be indicative of the Doppler shifts in the reflected radar signals 124. Although single-tone CW radar signals may be relatively simple to implement (e.g., in terms of cost and/or complexity), single-tone CW radar signals tend to be limited in range and application (e.g., single-tone CW radar signals may only be used to detect object velocity).

For other embodiments, the AP 110 may use pulse compression to modulate the radar signals 122 and detect the pattern of Doppler shifts in the reflected radar signals 124. For example, the AP 110 may modulate the radar signals 122 using a frequency "chirp" modulation scheme (e.g., by varying the frequency of the radar signals 122 based on a predetermined pattern) or using pseudo-random noise (PN) coding (e.g., by encoding the radar signals 122 with a predetermined PN sequence). The modulated radar signals 122 may be used to detect objects (e.g., user activity 101) at longer ranges than single-tone CW radar signals. Moreover, the additional layer of information introduced into the radar signals 122 through pulse compression may be used to determine the distance to the object, in addition to its velocity. Thus, although pulse compression radar signals may be more expensive and/or complex to implement than single-tone CW radar signals, pulse compression radar signals may also be used to detect a greater range of gestures and/or movements.

By implementing a radar-based sounding technique (e.g., as described above with respect to FIG. 1B), the AP 110 may detect a greater range of user activity 101 and/or more accurately detect the user activity 101 in the wireless channel 150, even when a substantial amount of noise is present in the wireless channel 150 (e.g., when the detected noise is greater than the noise threshold level). However, because the radar-based sounding techniques depend on the use of radar signals 122 (e.g., as opposed to wireless communication signals 112), the AP 110 may need to temporarily pause data communications with the STA 120 and/or other STAs in the wireless network when performing a radar-based HCI sounding technique (e.g., unless the AP 110 includes a separate wireless radio for transmitting and receiving radar signals 122). Thus, in some example embodiments, the AP 110 may dynamically switch between data-compliant HCI sounding techniques and radar-based HCI sounding techniques depending on the amount of noise in the wireless channel 150.

The example wireless HCI system 100 has been described in the context of a single AP (AP 110) and a single STA (STA120) for example purposes only. In other implementations, the AP 110 may be wirelessly connected to a plurality of STAs (e.g., via a WLAN). In example embodiments, the AP 110 may leverage wireless communications with the plurality of STAs to more accurately detect and/or classify the user activity 101.

Figure 2:
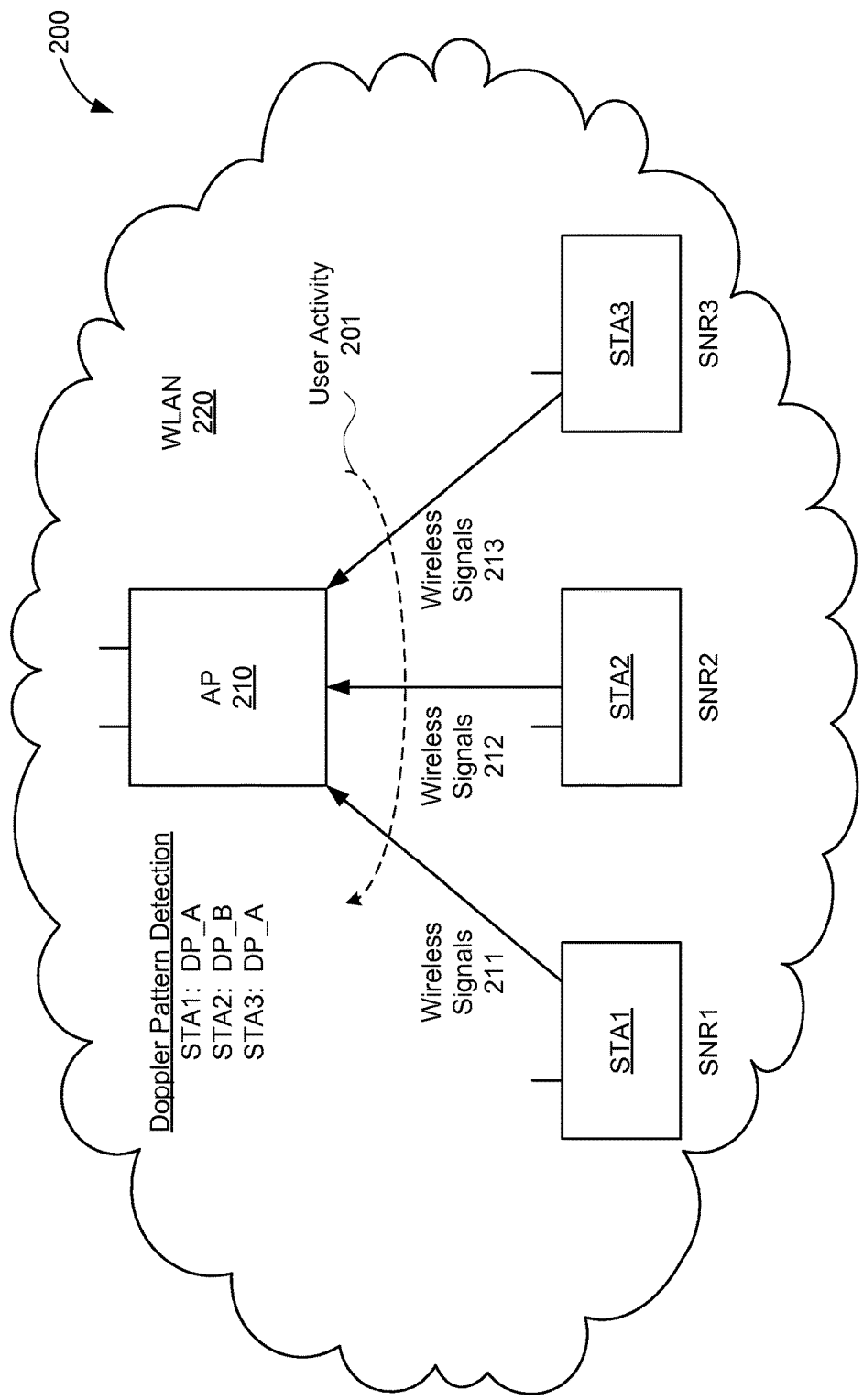
FIG. 2 shows a block diagram of a wireless HCI system with multi-node HCI gesture recognition, in accordance with example embodiments.

FIG. 2 shows a block diagram of a wireless HCI system 200 with multi-node HCI gesture recognition, in accordance with example embodiments. The wireless HCI system 200 is shown to include an AP 210, a number of wireless stations STA1-STA3, and a wireless local area network (WLAN) 220. For purposes of discussion, the AP 210 may be one embodiment of AP 110 of FIGS. 1A-1B. Furthermore, each of the stations STA1-STA3 may be an embodiment of STA 120 of FIGS. 1A-1B. The WLAN 220 may be formed by a plurality of Wi-Fi APs that may operate according to the IEEE 802.11 family of standards (or according to other suitable wireless protocols). Thus, although only one AP 210 is shown in FIG. 2 for simplicity, it is to be understood that WLAN 220 may be formed by any number of access points such as AP 210.

The AP 210 may detect user activity 201 based on Doppler shifts in wireless signals 211-213 received from each of the stations STA1-STA3, respectively. As described above, the user activity 201 may cause a detectable pattern of Doppler shifts in each of the wireless signals 211-213. However, depending on the relative positions of the stations STA1-STA3 with respect to AP 210 and/or channel conditions (e.g., noise, interference, etc.), the wireless signals 211-213 may not all exhibit the same pattern of Doppler shifts. More specifically, the user's position and/or gesture associated with user activity 201 may affect individual wireless signals 211-213 differently.

For example, with reference to FIG. 2, the AP 210 may detect a first pattern of Doppler shifts (DP_A) in the wireless signals 211 and 213 transmitted by STA1 and STA3, respectively. Further, the AP 210 may detect a second pattern of Doppler shifts (DP_B) in the wireless signals 212 transmitted by STA2. The first pattern of Doppler shifts DP_A and the second pattern of Doppler shifts DP_B may correspond with different Doppler signatures, and thus different user inputs, for the same user activity 201. Thus, in example embodiments, the AP 210 may select one of the patterns of Doppler shifts DP_A or DP_B to be a representative Doppler pattern for the user activity 201.

For some embodiments, the AP 210 may select the representative Doppler pattern based, at least in part, on a "majority vote." For example, the AP 210 may select the most popular or most commonly-detected pattern among the plurality of stations STA1-STA3 to be the representative Doppler pattern. In the example shown in FIG. 2, wireless signals 211 and 213 from stations STA1 and STA3, respectively, both exhibit the first pattern of Doppler shifts DP_A, whereas only the wireless signals 212 from STA 2 exhibit the second pattern of Doppler shifts DP_B. Thus, based solely on majority vote, the AP 210 may select the first pattern of Doppler shifts DP_A to be the representative Doppler pattern for the user activity 201.

For other embodiments, the AP 210 may select the representative Doppler pattern based, at least in part, on a respective signal quality of each of the received wireless signals 211-213. For example, the AP 210 may select the pattern of Doppler shifts associated with the station STA1, STA2, or STA3 that exhibits the highest SNR (or SINR). In the example shown in FIG. 2, the wireless channel between the AP 210 and STA1 may be characterized by a first SNR (SNR1), the wireless channel between the AP 210 and STA2 may be characterized by a second SNR (SNR2), and the wireless channel between the AP 210 and STA3 may be characterized by a third SNR (SNR3). For purposes of discussion, wireless signals 212 may have a higher signal quality than wireless signals 211 and 213 (e.g., SNR2>SNR1 and SNR2>SNR3). Thus, based solely on signal quality, the AP 210 may select the second pattern of Doppler shifts DP_B (detected from wireless signals 212) to be the representative Doppler pattern for the user activity 201.

Still further, for some embodiments, the AP 210 may select the representative Doppler pattern based on a combination of factors such as, but not limited to, a majority vote and a respective signal quality of each of the received wireless signals 211-213. For example, the AP 210 may first determine the pattern of Doppler shifts "voted on" by each of the stations STA1-STA3. In the example of FIG. 2, STA1 and STA3 vote for the first pattern of Doppler shifts DP_A, whereas STA2 votes for the second pattern of Doppler shifts DP_B. The AP 210 may then assign a weighting metric to each vote based on the SNR exhibited by each of the respective stations STA1-STA3. In this example, the votes cast by STA1 and STA3 may each be assigned a weight of 2 (e.g., SNR1=SNR3), whereas the vote cast by STA2 may be assigned a weight of 3 (e.g., SNR2>SNR1 and SNR2>SNR3). These example voting results are summarized in Table 1, below.

TABLE 1

|      | Vote | Weight |
| ---- | ---- | ------ |
| STA1 | DP_A | 2      |
| STA2 | DP_B | 3      |
| STA3 | DP_A | 2      |

As a result, 4 votes are effectively cast for DP_A, whereas only 3 votes are effectively cast for DP_B. Thus, in this example, the AP 210 may select the first pattern of Doppler shifts DP_A to be the representative Doppler pattern for the user activity 201. In the event of a tie, the AP 210 may use one or more voting criteria to break the tie. For example, Table 2 illustrates an example scenario in which there is a tie between the first pattern of Doppler shifts DP_A and the second pattern of Doppler shifts DP_B (e.g., both DP_A and DP_B have a total of 2 effective votes).

TABLE 2

|  | Vote | Weight |
|---|---|---|
| STA1 | DP_A | 1 |
| STA2 | DP_B | 2 |
| STA3 | DP_A | 1 |

In some embodiments, the AP 210 may select the most commonly-detected pattern of Doppler shifts, among the patterns involved in the tie, to be the representative Doppler pattern for the user activity 201. For example, with reference to Table 2, the first pattern of Doppler shifts DP_A is detected from wireless signals 211 and 213 transmitted by two different STAs (e.g., STA1 and STA3, respectively), whereas the second pattern of Doppler shifts DP_B is detected from wireless signals 212 transmitted by only one STA (e.g., STA2). Thus, based on the aforementioned tie-break criteria, the AP 210 may select the first pattern of Doppler shifts DP_A to be the representative Doppler pattern for the user activity 201.

In other embodiments, the AP 210 may select the pattern of Doppler shifts associated with the single highest weighting metric, among the patterns involved in the tie, to be the representative Doppler pattern for the user activity 201. For example, with reference to Table 2, the single highest weight assigned to the second pattern of Doppler shifts DP_B is 2 (e.g., based on the vote by STA2), whereas the single highest weight assigned to the first pattern of Doppler shifts DP_A is 1 (e.g., based on votes by STA1 and STA3). Thus, based on the aforementioned tiebreak criteria, the AP 210 may select the second pattern of Doppler shifts DP_B to be the representative Doppler pattern for the user activity 201.

Still further, the AP 210 may implement various combinations of tiebreaking criteria that may include, but are not limited to, any of the criteria described above. For example, in an alternative embodiment, the vote cast by a predetermined one of the stations STA1, STA2, or STA3 may always be used to determine the representative Doppler pattern in the event of a tie.

Upon determining the representative Doppler pattern, the AP 210 may classify the corresponding pattern of Doppler shifts as a particular Doppler signature (e.g., by comparing the representative Doppler pattern to a set of known Doppler patterns). The AP 210 may then associate the Doppler signature with a particular user input that may be used to control various operations of one or more of the stations STA1-STA3. For some embodiments, the user input may control only one of the stations STA1, STA2, or STA3. For example, the user input may be used to power on or power off STA2, even though the representative Doppler pattern was detected from the wireless signals 211 and 213 transmitted by stations STA1 and STA3. For other embodiments, the user input may control a plurality of the stations STA1-STA3. For example, the user input may be used to power on or power off all of the stations STA1-STA3, concurrently.

Figure 3:
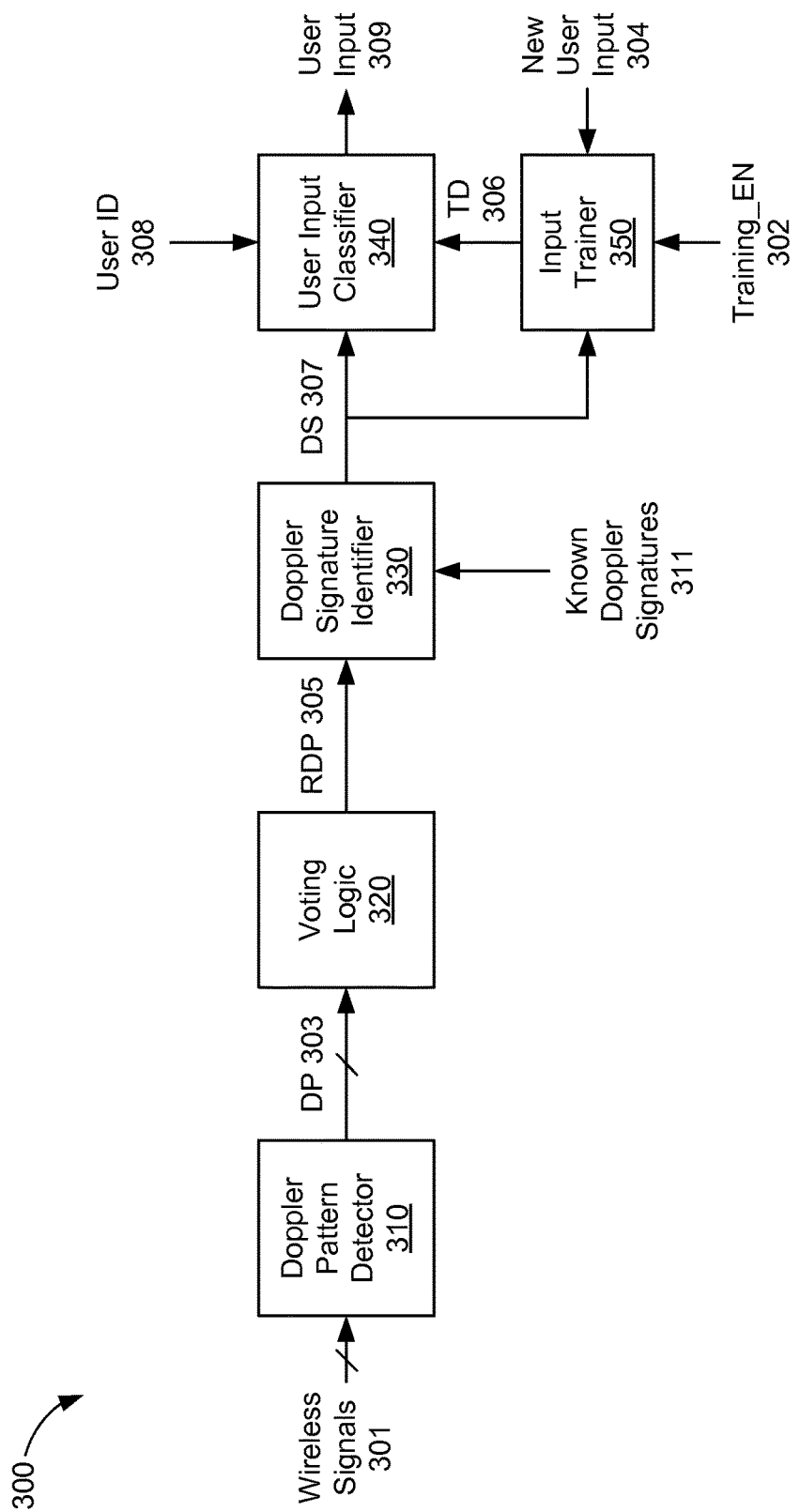
FIG. 3 shows a block diagram of an HCI controller, in accordance with example embodiments.

FIG. 3 shows a block diagram of an HCI controller 300, in accordance with example embodiments. The HCI controller 300 may be implemented by AP 110 of FIG. 1 and/or AP 210 of FIG. 2 to provide HCI functionality to the respective wireless HCI systems 100 and/or 200. The HCI controller 300 includes a Doppler pattern detector 310, a voting logic 320, a Doppler signature identifier 330, a user input classifier 340, and an input trainer 350. The HCI controller 300 may detect user activity (e.g., gestures, body movement, etc.) in a wireless medium based on received wireless signals 301, and in response thereto generate a user input 309 representative of the user activity.

The Doppler pattern detector 310 receives one or more sets of wireless signals 301 via the wireless medium and detects a pattern of Doppler shifts (DP) 303 for each set of received signals 301. For example, the wireless signals 301 may include data signals transmitted by one or more STAs in a wireless network (e.g., as described above with respect to FIG. 1A). Thus, the Doppler pattern detector 310 may detect the pattern(s) of Doppler shifts 303 based on data communicated in the wireless signals 301 (e.g., preamble and/or payload information). Alternatively, and/or in addition, the wireless signals 301 may include backscattered radar signals transmitted by a device on which the HCI controller 300 resides (e.g., as described above with respect to FIG. 1B). Thus, for some implementations, the Doppler pattern detector 310 may detect the pattern(s) of Doppler shifts 303 based on changes in the round-trip times and/or phases between successive wireless signals in each set of wireless signals 301.

The voting logic 320 receives the pattern(s) of Doppler shifts 303 from the Doppler pattern detector 310, and selects one of the patterns 303 to be a representative Doppler pattern (RDP) 305 for the user activity. For example, the voting logic 320 may select the representative Doppler pattern based on a number of factors including, but not limited to, a majority vote and/or a signal quality of each of the received wireless signals 301 (e.g., as described above with respect to FIG. 2). However, if the HCI controller 300 receives only one set of wireless signals 301, then the voting logic 320 may simply output the corresponding pattern of Doppler shifts 303 detected for that particular set of wireless signals 301 as the representative Doppler pattern 305.

In example embodiments, the voting logic 320 may first identify the different (e.g., independently distinguishable) patterns of Doppler shifts among those detected, and assign a vote to each of those patterns based on the number of times that the particular pattern of Doppler shifts was detected among the total set of received wireless signals 301. The voting logic 320 may then assign a weight to each vote based on the signal quality (e.g., SNR or SINR) of the corresponding wireless signal 301. Finally, the voting logic 320 may then select the pattern with the greatest number of effective votes (e.g., based on the weighting) as the representative Doppler pattern 305 for the detected user activity.

The Doppler signature identifier 330 receives the representative Doppler pattern 305 from the voting logic 320, and matches the pattern to a known Doppler signature 307. For example, the Doppler signature identifier 330 may compare the representative Doppler pattern 305 with a set of predetermined Doppler patterns or signatures 311 that are recognizable by the HCI controller 300 (e.g., through a training process). Not all user activity (e.g., Doppler patterns) may be recognized, or trigger a particular action, by the HCI controller 300. For example, the Doppler pattern associated with a user simply walking through the wireless medium may be associated with any particular user input 309. Moreover, certain types of gestures may not be difficult to detect and/or distinguish from other types of gestures based on the Doppler shifts they create. Thus, the HCI controller 300 may be preconfigured to recognize only a finite set of Doppler signatures. In example embodiments, the Doppler signature identifier 330 may thus select the Doppler signature 307 that matches (or most closely matches) the representative Doppler pattern 305, if available.

The user input classifier 340 converts the selected or "matched" Doppler signature 307 into a user input 309 that may be used to control and/or operate one or more wireless devices communicatively coupled to the HCI controller 300. For example, the user input classifier 340 may associate the matched Doppler signature 307 with a corresponding user input 309 (e.g., to identify a particular user). For some embodiments, a particular Doppler signature 307 may be associated with multiple user inputs 309. For example, the Doppler signature 307 associated with a hand-waving gesture may be used to power on and/or power off multiple devices (e.g., and to identify particular devices such as TVs, radios, computers, etc.) in a wireless network. Accordingly, upon receiving the Doppler signature 307, the user input classifier 340 may generate a respective user input 309 for each of the associated devices.

Furthermore, the same Doppler signature 307 may be associated with different sets of user inputs 309 for different users. For example, a hand-waving gesture (e.g., associated with a given Doppler signature 307) may be used to power on and/or power off a television when the gesture is performed by a particular user. However, a substantially similar hand-waving gesture (e.g., associated with the same Doppler signature 307) may be used to adjust the volume of a radio when the gesture is performed by a different user. In example embodiments, the user may identify him/herself to the HCI controller 300 upon activating HCI control functions. For example, the user input classifier 340 may receive a user ID 308 which may be used to locate or identify a set of user inputs 309 specific to the current user. The user input classifier 340 may then map the received Doppler signature 307 to a user input 309 (or set of user inputs) for a particular user based on the user ID 308.

For some embodiments, the input trainer 350 may be used to train the HCI controller 300 to recognize particular types of user activity and/or associate each type of user activity with one or more user inputs. The input trainer 350 may be activated in response to a training enable signal 302. Alternatively, the input trainer 350 may be activated using a preconfigured gesture or user activity. For example, the input trainer 350 may place the HCI controller 300 in a "training mode" upon detecting a Doppler signature 307 corresponding to the preconfigured gesture. When operating in the training mode, the HCI controller 300 does not process gestures or other user activity detected in the wireless medium as known user inputs 309, but rather associates the detected gestures with new user inputs 304.

For example, upon initiation of the training mode, the HCI controller 300 may first prompt the user for a user ID 308 through voice, text message, or display. The user may provide the user ID 308 by performing a particular gesture or activity and/or input the user ID 308 using one or more peripheral devices (e.g., a keyboard and mouse). The HCI controller 300 may then prompt the user to enter a new user input 304 that may cause one or more devices communicatively coupled to the HCI controller 300 to perform a particular function and/or operate in a particular manner (e.g., such as powering on and/or powering off). Finally, the HCI controller 300 may prompt the user to perform a gesture or body movement that will subsequently trigger the new user input 304 (e.g., such as a hand-waving gesture).

The user's gesture may be imprinted (e.g., as a pattern of Doppler shifts) in a set of wireless signals 301 received by the HCI controller 300. The wireless signals 301 are processed by the Doppler pattern detector 310, the voting logic 320, and the Doppler signature identifier 330, and then converted to a Doppler signature 307. The input trainer 350 associates the Doppler signature 307 with the new user input 304 and generates a record of the association. The record is then provided to the user input classifier 340 as training data (TD) 306, where it may be stored (e.g., in association with the user ID 308) for future use by the user input classifier 340 (e.g., for purposes of classifying subsequent Doppler signatures 307 as known user inputs 309). The training process may be repeated to train additional user inputs 304 until the training enable signal 302 is deactivated and/or the user performs a gesture signaling the end of the training process.

Figure 4:
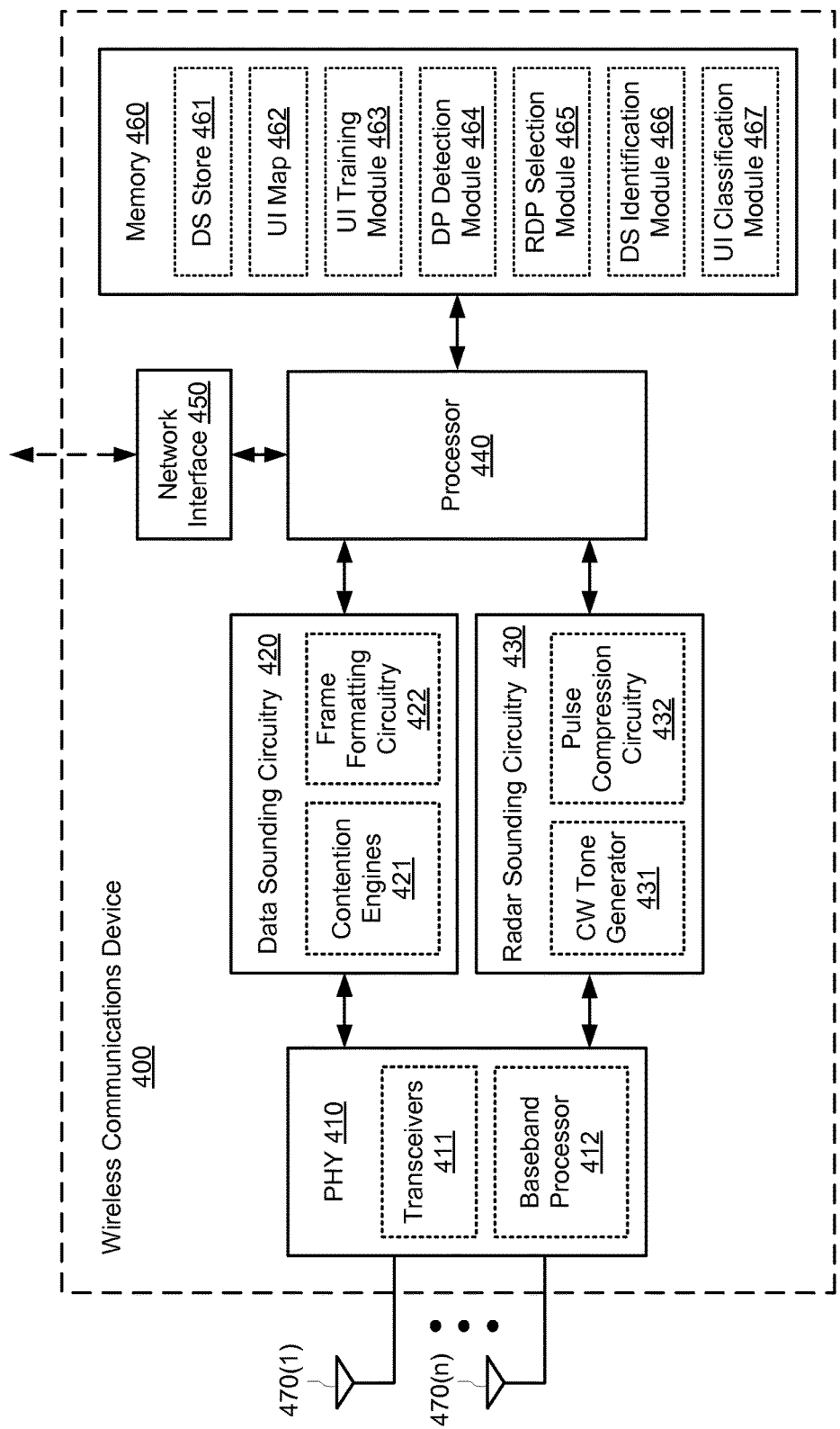
FIG. 4 shows a block diagram of a wireless communications device in accordance with example embodiments.

FIG. 4 shows a block diagram of a wireless communications device 400 in accordance with example embodiments. The device 400 may be one embodiment of the AP 110 or STA 120 of FIG. 1, and/or AP 210 or any of the stations STA1-STA3 of FIG. 2. The device 400 includes at least a PHY device 410, data sounding circuitry 420, radar sounding circuitry 430, a processor 440, a network interface 450, memory 460, and a number of antennas 470(1)-470(n). In some examples, the data sounding circuitry 420 and radar sounding circuitry 430 may reside within the PHY 410. In example embodiments, the device 400 may belong to an HCI system (not shown for simplicity) formed, at least in part, by a network of wireless devices (e.g., WLAN 220). For example, the network interface 450 may be used to communicate with a WLAN server either directly or via one or more intervening networks, and to transmit signals.

The PHY device 410 includes at least a set of transceivers 411 and a baseband processor 412. The transceivers 411 may be coupled to antennas 470(1)-470(n), either directly or through an antenna selection circuit (not shown for simplicity). The transceivers 411 may be used to transmit signals to and receive signals from other wireless devices (e.g., APs and/or STAs), and may be used to scan the surrounding environment to detect and identify nearby wireless devices (e.g., within wireless range of the wireless communications device 400). The baseband processor 412 may be used to process signals received from processor 440 and/or memory 460 and to forward the processed signals to transceivers 411 for transmission via one or more antennas 470(1)-470(n). The baseband processor 412 may also be used to process signals received from one or more antennas 470(1)-470(n) via transceivers 411 and to forward the processed signals to the processor 440 and/or memory 460.

For purposes of discussion herein, the data sounding circuitry 420 and radar sounding circuitry 430 are shown in FIG. 4 as being coupled between the PHY device 410 and processor 440. However, for actual embodiments, PHY device 410, data sounding circuitry 420, radar sounding circuitry 430, processor 440, network interface 450, and/or memory 460 may be connected together using one or more buses (not shown for simplicity).

The data sounding circuitry 420 includes at least a set of contention engines 421 and frame formatting circuitry 422. The contention engines 421 may contend for access to a shared wireless medium, and may also store packets for transmission over the shared wireless medium. For some embodiments, the contention engines 421 may be implemented as one or more software modules (e.g., stored in memory 460 or stored in memory provided within the data sounding circuitry 420) containing instructions that, when executed by processor 440, perform the functions of the contention engines 421. The frame formatting circuitry 422 may be used to create and/or format frames received from the processor 440 and/or memory 460 (e.g., by adding MAC headers to data packets provided by processor 440), and may be used to re-format frames received from the PHY device 410 (e.g., by stripping MAC headers from frames received from the PHY device 410).

The radar sounding circuitry 430 includes at least a continuous wave (CW) tone generator 431 and pulse compression circuitry 432. The CW tone generator 431 may generate single-tone radar signals at a particular radar frequency. The pulse compression circuitry 432 may modulate the radar signals generated by the CW tone generator 431, for example, using pulse compression techniques. For some embodiments, the pulse compression circuitry 432 may modulate the radar signals using a frequency chirp modulation scheme. For other embodiments, the pulse compression circuitry 432 may modulate the radar signals using PN coding. For still other embodiments, the pulse compression circuitry 432 may be implemented as one or more software modules (e.g., stored in memory 460 or stored in memory provided within the radar sounding circuitry 430) containing instructions that, when executed by processor 440, perform the functions of the pulse compression circuitry 432.

Memory 460 may include a Doppler signature (DS) store 461 and a user input (UI) map 462. The DS store 461 may store data that may be used to identify patterns of Doppler shifts, in received wireless signals, that are independently distinguishable and/or recognized by the device 400. The UI map 462 may store a number of user inputs or instructions that may be used to control and/or operate one or more wireless devices in the HCI system (e.g., including devices that are communicatively coupled to the wireless communications device 400). Furthermore, the UI map 462 may store information that can be used to map each of the user inputs to a particular pattern of Doppler shifts (e.g., Doppler signatures) stored by the DS store 461. For some embodiments, the user inputs stored by the UI map 462 may be organized in accordance with one or more users of the device 400 and/or an HCI system to which the device 400 belongs.

Memory 460 may also include a non-transitory computer-readable medium (e.g., one or more nonvolatile memory elements, such as EPROM, EEPROM, Flash memory, a hard drive, and so on) that may store at least the following software (SW) modules:

a user input (UI) training module 463 to associate Doppler signatures (e.g., user activity) with new, user-configured inputs that may be used to control and/or operate one or more wireless devices in the HCI system;
  a Doppler pattern (DP) detection module 464 to detect patterns of Doppler shifts in wireless signals received by the device 400 (e.g., via antennas 470(1)-470(n));
  a representative Doppler pattern (RDP) selection module 465 to select one of a plurality of detected patterns of Doppler shifts to be representative of a particular gesture, body movement, or other user activity in the wireless medium;
  a Doppler signature (DS) identification module 466 to associate the representative Doppler pattern with a closest-matching Doppler signature recognizable by the device 400; and
  a user input (UI) classification module 467 to map the Doppler signature to one or more user inputs for a user of the HCI system.

Each software module includes instructions that, when executed by processor 440, cause the device 400 to perform the corresponding functions. The non-transitory computer-readable medium of memory 460 thus includes instructions for performing all or a portion of the operations depicted in FIGS. 5-8.

The processor 440 may be any suitable one or more processors capable of executing scripts or instructions of one or more software programs stored by the wireless communications device 400 (e.g., within memory 460). For example, processor 440 may execute the UI training module 463 to associate Doppler signatures (e.g., user activity) with new, user-configured inputs that may be used to control and/or operate one or more wireless devices in the HCI system.

Further, processor 440 may execute the DP detection module 464 to detect patterns of Doppler shifts in wireless signals received by the device 400 (e.g., via antennas 470(1)-470(n)), and may execute the RDP selection module 465 to select one of a plurality of detected patterns of Doppler shifts to be representative of a particular gesture, body movement, or other user activity in the wireless medium. Still further, processor 440 may execute the DS identification module 466 to associate the representative Doppler pattern with a closest-matching Doppler signature recognizable by the device 400, and may execute the UI classification module 467 to map the Doppler signature to one or more user inputs for a user of the HCI system.

Figure 5:
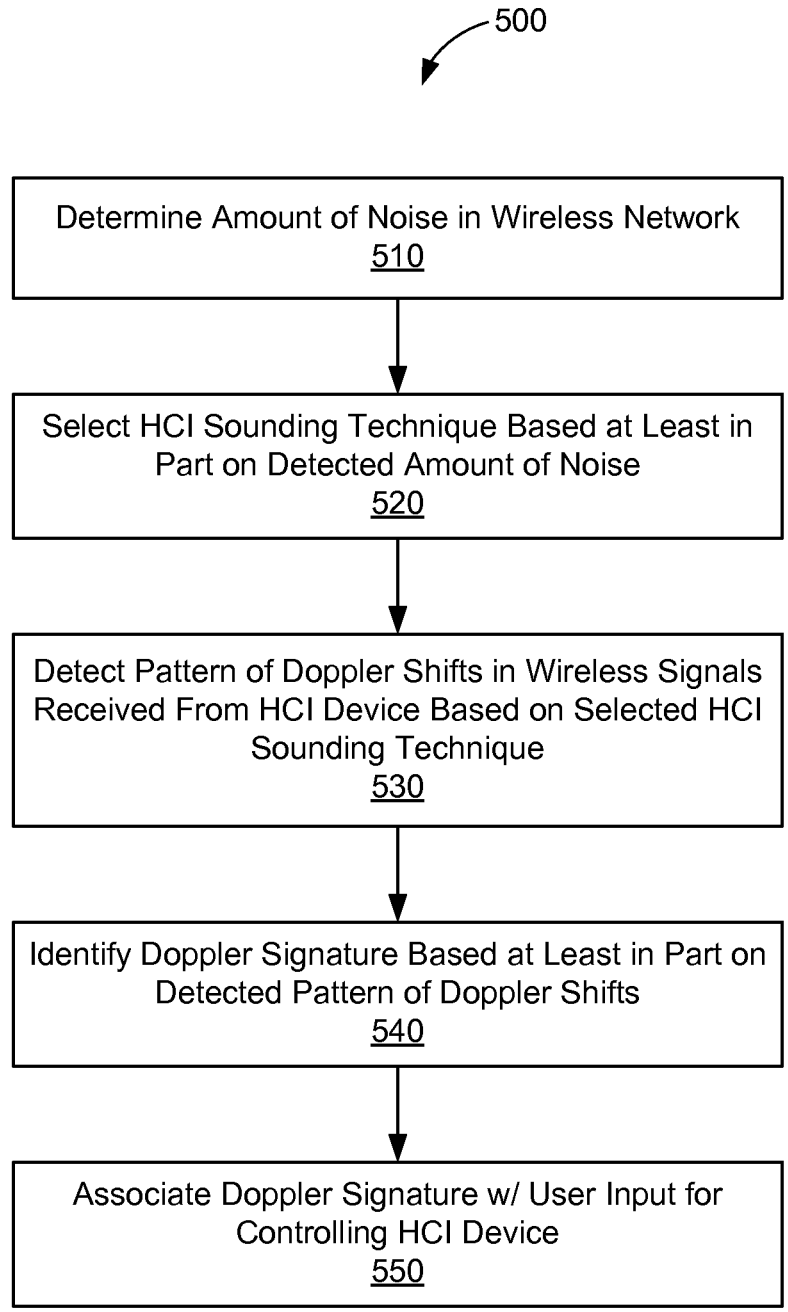
FIG. 5 shows a flowchart depicting an example HCI operation for a wireless communications device.

FIG. 5 shows an illustrative flowchart depicting an example HCI operation 500 for a wireless communications device. With reference, for example, to FIGS. 1A and 1B, the operation 500 may be performed by the AP 110 to operate a human control interface (HCI) for the STA 120 via a wireless network.

The AP 110 first detects an amount of noise in the wireless network (510). As described above, with reference to FIGS. 1A-1B, certain HCI sounding techniques may be preferable over others depending on the amount of noise in the wireless channel 150. For example, a large amount of noise and/or other interference in the wireless channel 150 may reduce the SNR and/or SINR of wireless communications between the AP 110 and the STA 120. Thus, in example embodiments, the AP 110 may determine the amount of noise in the wireless channel 150 based on SNR and/or SINR values.

The AP 110 selects an HCI sounding technique based, at least in part, on the detected amount of noise (520). For example, data-dependent sounding techniques may be less reliable for purposes of detecting user activity 101 in the wireless channel 150 than radar-based sounding techniques when there is substantial noise (e.g., greater than a threshold noise level) in the wireless channel 150. On the other hand, radar-based sounding techniques may interrupt the flow of data traffic between the AP 110 and the STA 120. Thus, in example embodiments, the AP 110 may implement a data-compliant sounding technique to detect the user activity 101 when the noise in the wireless channel 150 is less than a threshold noise level, and may implement a radar-based sounding technique to detect the user activity 101 when the noise in the wireless channel 150 is greater than or equal to the threshold noise level.

The AP 110 then detects a pattern of Doppler shifts in wireless signals received from an HCI device (e.g., the STA 120) using the selected HCI sounding technique (530). For example, as described above with respect to FIG. 1A, when implementing a data-compliant sounding technique, the AP 110 may detect the pattern of Doppler shifts (e.g., caused by user activity 101) based on preamble and/or payload data in the wireless communication signals 114 received from the STA 120. On the other hand, as described above with respect to FIG. 1B, when implementing a radar-based sounding technique, the AP 110 may detect the pattern of Doppler shifts (e.g., caused by user activity 101) based on variations in the round-trip times and/or phases of received (e.g., backscattered) radar signals 124.

Further, the AP 110 may identify a Doppler signature based, at least in part, on the detected pattern of Doppler shifts (540). For example, not all user activity 101 (e.g., Doppler patterns) may be recognized and/or or trigger an HCI-related action by the AP 110. Moreover, certain types of user activity may be difficult to detect and/or distinguish from other types of user activity based on the Doppler shifts they create. Thus, the AP 110 may be preconfigured to recognize only a finite set of Doppler signatures. In example embodiments, the AP 110 may select the Doppler signature that most closely matches a pattern of Doppler shifts that is representative of the user activity 101.

Finally, the AP 110 may associate the Doppler signature with a user input for controlling the HCI device (e.g., STA 120) (550). For example, a particular Doppler signature may be associated with (e.g., and thus trigger) multiple user inputs (e.g., HCI inputs 102). On the other hand, the same Doppler signature may also trigger a different set of user inputs depending on the user. Thus, in example embodiments, the AP 110 may generate one or more HCI inputs 102 based on the identified Doppler signature and the current user of the HCI system 100.

Figure 6:
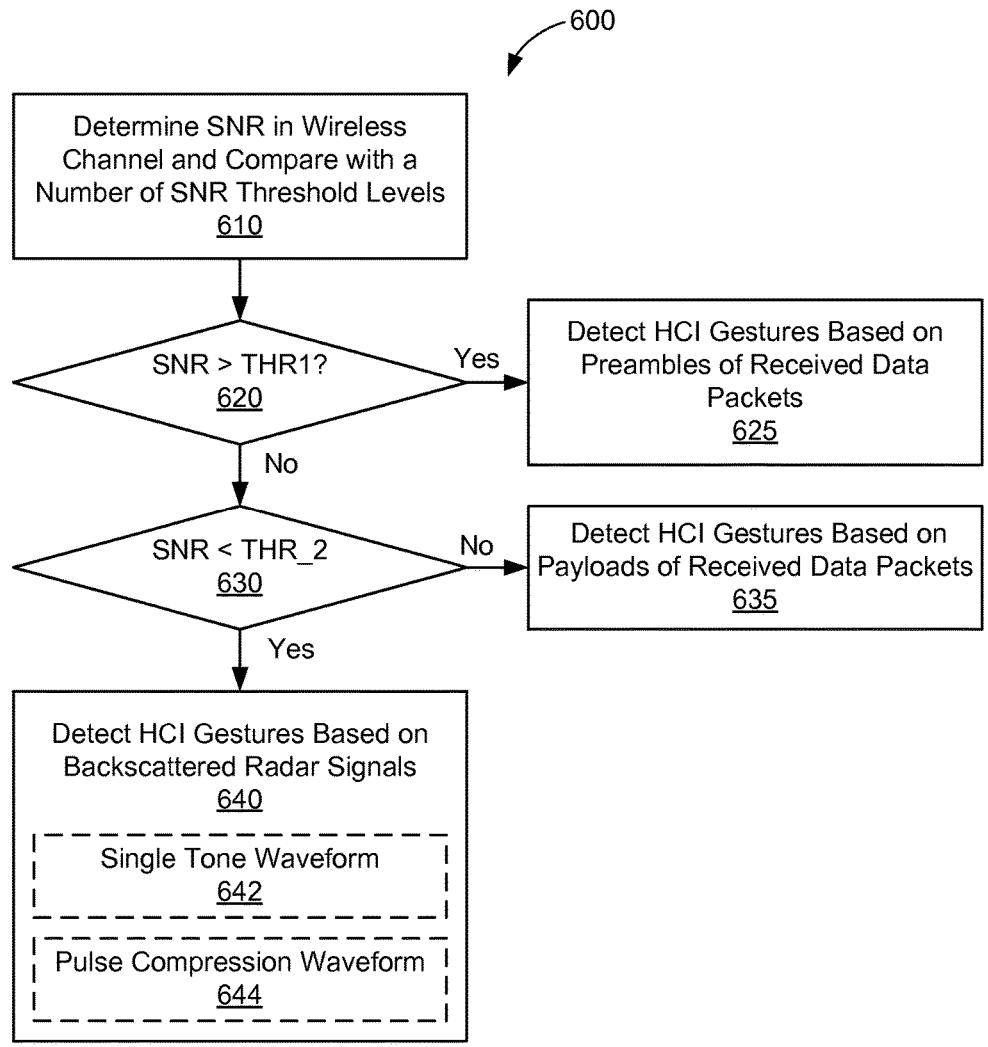
FIG. 6 shows a flowchart depicting an example operation for selecting a sounding technique to be used for HCI gesture detection.

FIG. 6 shows an illustrative flowchart depicting an example operation 600 for selecting a sounding technique to be used for HCI gesture detection. With reference, for example, to FIGS. 1A and 1B, the operation 600 may be performed by the AP 110 to operate a human control interface (HCI) for the STA 120 via a wireless network.

The AP 110 first determines an SNR in the wireless channel 150, and then compares the determined SNR with a number of SNR thresholds (610). As described above, with reference to FIGS. 1A-1B, certain HCI sounding techniques may be preferable over other sounding techniques depending on the amount of noise in the wireless channel 150.

If the SNR is greater than a first SNR threshold (as tested at 620), the AP 110 may detect HCI gestures in the wireless channel 150 based on information contained in the preamble of data packets received from the STA 120 (625). The preamble is typically very short (e.g., in comparison to the payload of a data packet), thus may be highly susceptible to noise in the wireless channel 150. Therefore, the AP 110 may accurately detect the pattern of Doppler shifts from the preambles of received data packets only if the SNR of the wireless channel 150 is very high (e.g., above the highest SNR threshold). In example embodiments, the AP 110 may compare the LTF data contained in the preamble of the received data packets with their known values to determine the CSI of the wireless channel 150. The CSI may be representative of the pattern of Doppler shifts caused by the user activity 101.

If the SNR is less than (or equal to) the first SNR threshold (as tested at 620), but greater than (or equal to) a second SNR threshold (as tested at 630), the AP 110 may detect HCI gestures in the wireless channel 150 based on information contained in the payload of data packets received form the STA 120 (635). For example, the AP 110 may decode the transmitted data bits, use the decoded bits to normalize the received data, and then determine a channel response for the wireless channel 150 (e.g., using zero-forcing equalization techniques). The channel response may be representative of Doppler shifts caused by the user activity 101. In example embodiments, the AP 110 may analyze the Doppler shifts based on data packets received from the STA 120 while simultaneously or concurrently processing communications data (e.g., contained in the payload) of the received data packets.

If the SNR is less than the second SNR threshold (as tested at 630), the AP 110 may detect HCI gestures in the wireless channel 150 based on backscattered radar signals (640). For example, it may not be practical or even feasible to implement data-compliant HCI sounding techniques if the wireless channel 150 is too noisy, for example, because the noise may substantially degrade the accuracy of the transmitted data used by the AP 110 to detect Doppler shifts. Radar signals, on the other hand, tend to be much more robust against channel noise, for example, because they typically do not require complex signal modulation and/or data encoding (e.g., in comparison to packet-based data signals).

For some embodiments, the AP 110 may broadcast single-tone (e.g., un-modulated) CW radar signals and detect HCI gestures based on the pattern of Doppler shifts in the reflected (e.g., backscattered) radar signals (642). For example, the AP 110 may detect the Doppler shifts by measuring the round-trip times and/or phase variations between the transmission of the radar signals and the reception of the reflected radar signals. For other embodiments, the AP 110 may apply one or more pulse compression (e.g., modulation) techniques to the radar signals that are used for detecting the HCI gestures (644). For example, the AP 110 may modulate the radar signals using a frequency chirp modulation scheme or using PN coding to determine additional and/or more accurate information about the detected user activity (e.g., including range and velocity information).

Figure 7:
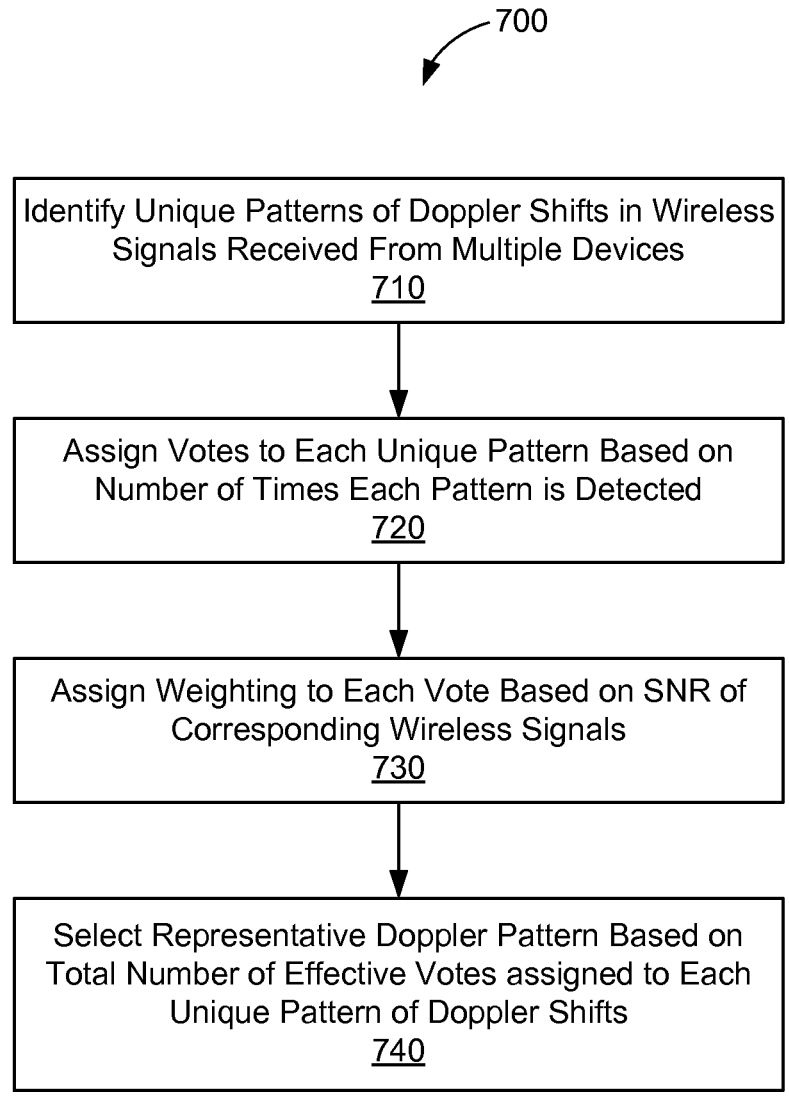
FIG. 7 shows a flowchart depicting an example operation for selecting a representative Doppler pattern for a detected HCI gesture.

FIG. 7 shows an illustrative flowchart depicting an example operation 700 for selecting a representative Doppler pattern for a detected HCI gesture. With reference, for example, to FIG. 2, the operation 700 may be performed by the AP 210 to select a representative Doppler pattern for user activity 201 among a plurality of detected patterns of Doppler shifts based on wireless signals 211-213 received from respective stations STA1-STA3.

The AP 210 may first identify one or more unique patterns of Doppler shifts in the wireless signals 211-213 received from multiple devices (710). For example, depending on the relative positions of the stations STA1-STA3 and/or channel conditions (e.g., noise, interference, etc.), the wireless signals 211-213 received by the AP 210 may not all exhibit the same pattern of Doppler shifts. In the example of FIG. 2, the wireless signals 211 and 213 transmitted by STA1 and STA3, respectively, exhibit a first pattern of Doppler shifts (DP_A), whereas the wireless signals 212 transmitted by STA2 exhibit a second pattern of Doppler shifts (DP_B). Accordingly, the AP 210 may identify two unique patterns of Doppler shifts (e.g., DP_A and DP_B) among the received wireless signals 211-213.

The AP 210 may assign a vote to each unique pattern of Doppler shifts based on the number of times that each pattern is detected (720). For example, each vote may be "cast by" or otherwise associated with the particular station STA1, STA2, or STA3 that transmitted the set of wireless signals that exhibited the pattern of Doppler shifts (e.g., wireless signals 211, 212, or 213, respectively). In the example of FIG. 2, the first pattern of Doppler shifts DP_A receives two votes (e.g., by STA1 and STA3), whereas the second pattern of Doppler shifts DP_B receives only one vote (e.g., by STA2).

The AP 210 may further assign a weighting to each vote based on the SNR of the corresponding wireless signals (730). For example, Doppler shifts may be more accurately and/or reliably detected in wireless signals with higher SNR values. Thus, a vote associated with a higher-SNR wireless signal may be weighted more heavily than a vote associated with a lower-SNR wireless signal. In the example of FIG. 2, wireless signals 211 and 213 have substantially the same SNR (e.g., SNR1=SNR3), whereas wireless signals 212 have a higher SNR than both wireless signals 211 and 213 (e.g., SNR2>SNR1 and SNR2>SNR3). Thus, the votes cast by STA1 and STA3 may be weighted equally, while the vote cast by STA2 may be weighted more heavily.

Finally, the AP 210 may select the representative Doppler pattern based on the total number of effective votes assigned to each unique pattern of Doppler shifts (740). In example embodiments, the AP 210 may select the pattern of Doppler shifts that receives the highest effective number of votes as the representative Doppler pattern for the user activity 201. For example, the weighting metric may directly impact the "effective" number of votes for a particular pattern of Doppler shifts, for example, such that a more heavily weighted vote counts for a greater number of effective votes than a less-heavily weighted vote. In the example of FIG. 2, and with reference to Table 1, 4 votes are effectively cast for the first pattern of Doppler shifts DP_A, whereas only 3 votes are effectively cast for the second pattern of Doppler shifts DP_B. Thus, the AP 210 may select the first pattern of Doppler shifts DP_A as the representative Doppler pattern for user activity 201.

Figure 8:
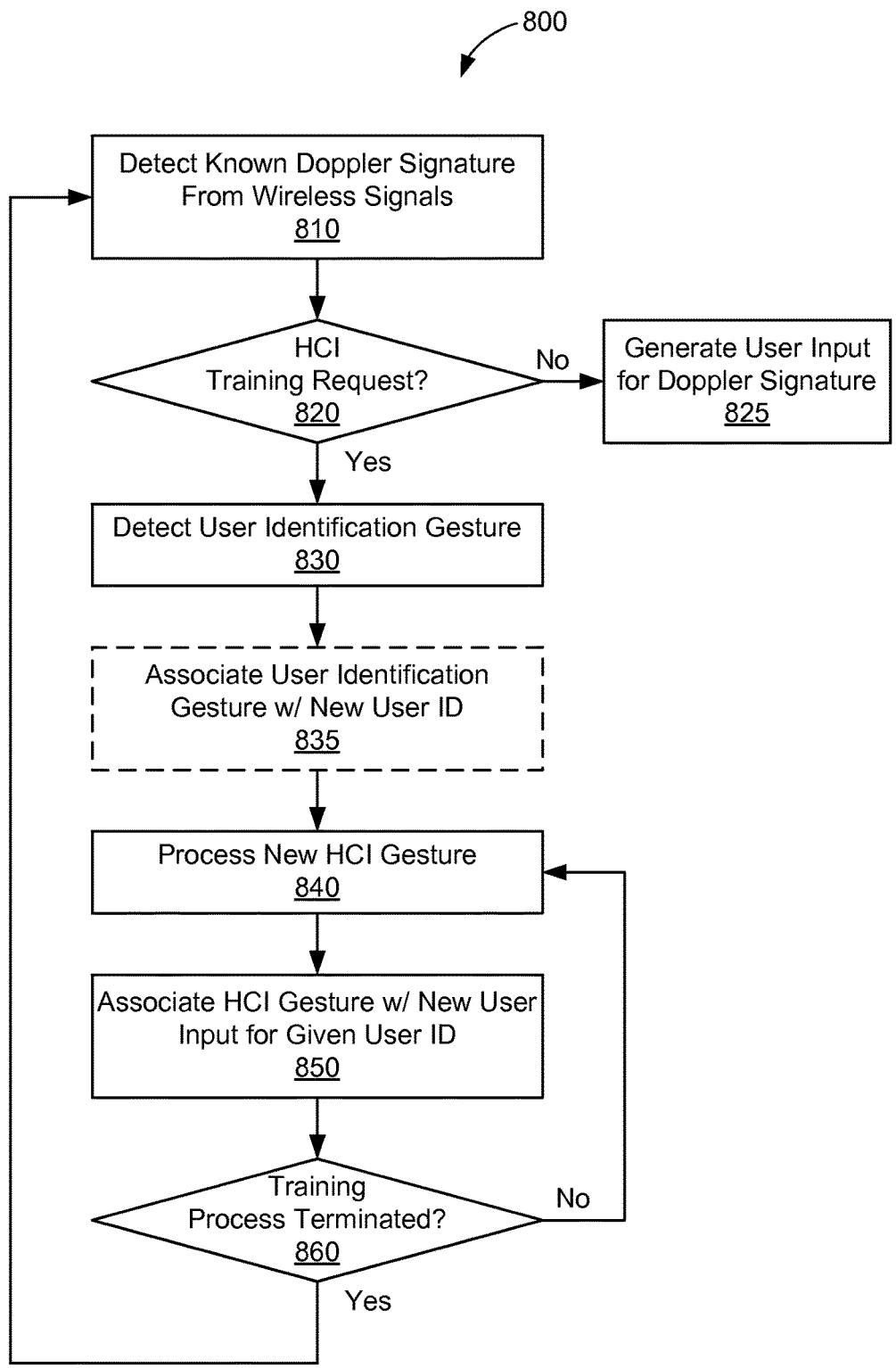
FIG. 8 shows a flowchart depicting an example operation for training HCI gesture-based user inputs.

FIG. 8 shows an illustrative flowchart depicting an example operation 800 for training HCI gesture-based user inputs. With reference, for example, to FIG. 3, the operation 800 may be performed by the HCI controller 300 to associate HCI gestures (e.g., detected based on received wireless signals 301) with user-configured inputs 304.

The HCI controller 300 detects a known Doppler signature from the received wireless signals 301 (810). In example embodiments, the HCI controller 300 may associate a preconfigured gesture or user activity with an HCI training request. Thus, the input trainer 350 may be configured to identify the Doppler signature 307 corresponding with the HCI training request, and place the HCI controller 300 in a training mode. If the detected Doppler signature does not correspond to an HCI training request (as tested at 820), the HCI controller 300 may proceed by generating a user input for the Doppler signature (825). For example, the Doppler signature 307 may be forwarded to the user input classifier 340 to be mapped to one or more user inputs.

If the detected Doppler signature corresponds with an HCI training request (as tested at 820), the HCI controller 300 may activate the training mode and may subsequently detect a user for a user identification gesture (830). For example, the user may identify him/herself to the HCI controller 300 by performing a particular gesture or activity associated with a user ID 308 for that particular user. Alternatively, the user may input his/her user ID 308 using one or more peripheral devices (e.g., a keyboard and mouse). If the HCI controller 300 does not recognize the gesture provided for user-identification purposes (e.g., the user is a new user), the HCI controller 300 may create a new user ID for the user and associated the gesture with the new user ID (835).

The HCI controller 300 may then process an HCI gesture to be learned or trained for the current user (840). For example, the HCI gesture may be imprinted (e.g., as a pattern of Doppler shifts) in a set of wireless signals 301 received by the HCI controller 300. The wireless signals 301 may then be processed by the Doppler pattern detector 310, the voting logic 320, and the Doppler signature identifier 330, and then converted to a Doppler signature 307 that is recognizable by the HCI controller 300.

Further, the HCI controller 300 may associate the HCI gesture with a new user input for the given user ID (850). For example, the user may enter a new user input 304 that may cause one or more devices communicatively coupled to the HCI controller 300 to perform a particular function and/or operate in a particular manner. The input trainer 350 may associate the Doppler signature 307 for the new HCI gesture with the new user input 304 and generate a record of the association. For some embodiments, the record may then be provided to the user input classifier 340, as training data 306, to be used at a later time for generating user inputs 309.

For some embodiments, the user may perform another preconfigured gesture to end the training process. For example, the input trainer 350 may be configured to identify the Doppler signature 307 corresponding with a request to terminate the training process, and take the HCI controller 300 out of training mode. As long as the training process has not been terminated (as tested at 860), the HCI controller 300 may continue to detect new HCI gestures by the current user (840) and associate the HCI gestures with new user inputs for that user (850). However, once the training process is terminated (as tested at 860), the HCI controller 300 may resume a normal operation. For example, the HCI controller 300 may resume scanning for HCI gestures in a wireless medium by detecting known Doppler signatures in the received wireless signals 301 (810).

Thus, a user may control and/or operate an HCI-enabled device (e.g., wireless communications device 400) using at least 3 distinctive gestures. The first gesture may be used to identify the user to the HCI-enabled device. The second gesture may be used to signal an input and/or command that will subsequently be used to control or operate a particular device or set of devices. The third gesture may be used as an acknowledgement (e.g., ACK) and/or to signal the completion of a particular step.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, the example embodiments have been described with reference to specific example embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of operating a human control interface (HCI) for one or more devices in a wireless network, the method being performed by a first device in the wireless network and comprising:
   determining an amount of noise in the wireless network;
   selecting one of a plurality of sounding techniques based at least in part on the determined amount of noise;
   detecting a pattern of Doppler shifts in a received set of wireless signals using the selected sounding technique;
   identifying a Doppler signature based at least in part on the pattern of Doppler shifts; and
   associating the Doppler signature with a user input for controlling a second device in the wireless network.

2. The method of claim 1, wherein the selecting comprises:
   selecting a data-compliant sounding technique based on the amount of noise being less than a threshold level, wherein the received set of wireless signals includes data packets transmitted by the second device.

3. The method of claim 2, further comprising:
   processing payload information from the data packets while concurrently detecting the pattern of Doppler shifts.

4. The method of claim 1, wherein the selecting comprises:
   selecting a radar sounding technique based on the amount of noise being greater than a threshold level, wherein the received set of wireless signals includes radar signals transmitted by the first device.

5. The method of claim 1, further comprising:
   detecting multiple patterns of Doppler shifts in wireless signals received from a plurality of devices in the wireless network.

6. The method of claim 5, wherein identifying the Doppler signature comprises:
   selecting one of the multiple patterns of Doppler shifts to be a representative Doppler pattern; and
   identifying the Doppler signature based on the selected pattern of Doppler shifts.

7. The method of claim 6, wherein selection of the representative Doppler pattern is based at least in part on a vote among the plurality of devices.

8. The method of claim 6, wherein selection of the representative Doppler pattern is based at least in part on a most commonly-detected pattern by the plurality of devices.

9. The method of claim 7, further comprising:
   applying a weighting metric to the vote associated with each of the plurality of devices, the weighting metric based at least in part on a signal quality of the wireless signals received from a corresponding one of the plurality of devices.

10. A wireless communications device, comprising:
    a transceiver to exchange wireless signals with other wireless devices in a wireless network;
    one or more processors; and
    a memory storing instructions that, when executed by the one or more processors, cause the wireless communications device to:
        determine an amount of noise in the wireless network;
        select one of a plurality of sounding techniques based at least in part on the determined amount of noise;
        detect a pattern of Doppler shifts in a received set of wireless signals using the selected sounding technique;
        identify a Doppler signature based at least in part on the pattern of Doppler shifts; and
        associate the Doppler signature with a user input for controlling a device in the wireless network.

11. The wireless communications device of claim 10, wherein execution of the instructions for selecting one of the plurality of sounding techniques causes the wireless communications device to:
    select a data-compliant sounding technique based on the amount of noise being less than a threshold level, wherein the received set of wireless signals includes data packets transmitted by the first device.

12. The wireless communications device of claim 11, wherein execution of the instructions further causes the wireless communications device to:
    process payload information from the data packets while concurrently detecting the pattern of Doppler shifts.

13. The wireless communications device of claim 10, wherein execution of the instructions to select one of the plurality of sounding techniques causes the wireless communications device to:
    select a radar sounding technique based on the amount of noise being greater than a threshold level, wherein the received set of wireless signals includes radar signals transmitted by the wireless communications device.

14. The wireless communications device of claim 10, wherein execution of the instructions further causes the wireless communications device to:
    detect multiple patterns of Doppler shifts in wireless signals received from a plurality of devices in the wireless network.

15. The wireless communications device of claim 14, wherein execution of the instructions to identify the Doppler signature causes the wireless communications device to:
    select one of the multiple patterns to be a representative Doppler pattern; and
    identify the Doppler signature based on the selected pattern of Doppler shifts.

16. The wireless communications device of claim 15, wherein selection of the representative Doppler pattern is based at least in part on a vote among the plurality of devices.

17. The wireless communications device of claim 16, wherein selection of the representative Doppler pattern is based at least in part on a most commonly-detected pattern by the plurality of devices.

18. The wireless communications device of claim 16, wherein execution of the instructions further causes the wireless communications device to:
    apply a weighting metric to the vote associated with each of the plurality of devices, the weighting metric based at least in part on a signal quality of the wireless signals received from a corresponding one of the plurality of devices.

19. A wireless communications device, comprising:
    means for determining an amount of noise in a wireless network;

means for selecting one of a plurality of sounding techniques based at least in part on the determined amount of noise;
means for detecting a pattern of Doppler shifts in a received set of wireless signals using the selected sounding technique;
means for identifying a Doppler signature based at least in part on the pattern of Doppler shifts; and
means for associating the Doppler signature with a user input for controlling a first device in the wireless network.

20. The wireless communications device of claim 19, wherein the means for selecting is to:
select a data-compliant sounding technique based on the amount of noise being less than a threshold level, wherein the received set of wireless signals includes data packets transmitted by the first device; and
select a radar sounding technique based on the amount of noise being greater than or equal to the threshold level, wherein the received set of wireless signals includes radar signals transmitted by the wireless communications device.

21. The wireless communications device of claim 20, further comprising:
means for processing payload information from the data packets while concurrently detecting the pattern of Doppler shifts.

22. The wireless communications device of claim 19, further comprising:
means for detecting multiple patterns of Doppler shifts in wireless signals received from a plurality of devices in the wireless network.

23. The wireless communications device of claim 22, wherein the means for identifying the Doppler signature is to:
select one of the multiple patterns to be a representative Doppler pattern; and
identify the Doppler signature based on the selected pattern of Doppler shifts.

24. The wireless communications device of claim 23, wherein selection of the representative Doppler pattern is based at least in part on a vote among the plurality of devices.

25. The wireless communications device of claim 24, wherein selection of the representative Doppler pattern is based at least in part on a most commonly-detected pattern by the plurality of devices.

26. The wireless communications device of claim 24, further comprising:
means for applying a weighting metric to the vote associated with each of the plurality of devices, the weighting metric based at least in part on a signal quality of the wireless signals received from a corresponding one of the plurality of devices.

27. A non-transitory computer-readable medium storing instructions that, when executed by one or more processors of a wireless communications device, cause the wireless communications device to:
determine an amount of noise in a wireless network;
select one of a plurality of sounding techniques based at least in part on the determined amount of noise;
detect a pattern of Doppler shifts in a received set of wireless signals using the selected sounding technique;
identify a Doppler signature based at least in part on the pattern of Doppler shifts; and
associate the Doppler signature with a user input for controlling a first device in the wireless network.

28. The non-transitory computer-readable storage medium of claim 27, wherein execution of the instructions to select one of the plurality of sounding techniques causes the wireless communications device to:
select a data-compliant sounding technique based on the amount of noise being less than a threshold level, wherein the wireless signals include data packets transmitted by the first device; and
select a radar sounding technique based on the amount of noise being greater than or equal to the threshold level, wherein the wireless signals include radar signals transmitted by the wireless communications device.

29. The non-transitory computer-readable storage medium of claim 27, wherein execution of the instructions further causes the wireless communications device to:
detect multiple patterns of Doppler shifts in wireless signals received from a plurality of devices in the wireless network.

30. The non-transitory computer-readable storage medium of claim 29, wherein execution of the instructions to select one of the plurality of sounding techniques causes the wireless communications device to:
select one of the multiple patterns to be a representative Doppler pattern based at least in part on a vote among the plurality of devices; and
identify the Doppler signature based on the selected pattern of Doppler shifts.

* * * * *